United States Patent
Uceda-Sosa et al.

(10) Patent No.: US 7,133,891 B1
(45) Date of Patent: Nov. 7, 2006

(54) METHOD, SYSTEM AND PROGRAM PRODUCTS FOR AUTOMATICALLY CONNECTING A CLIENT TO A SERVER OF A REPLICATED GROUP OF SERVERS

(75) Inventors: Rosario A. Uceda-Sosa, Hartsdale, NY (US); Gregory D. Laib, Kingston, NY (US); Steven R. Champagne, Poughkeepsie, NY (US); Kailash N. Marthi, Poughkeepsie, NY (US); Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 09/583,694

(22) Filed: May 31, 2000

(51) Int. Cl.
*G06F 15/16* (2006.01)
(52) U.S. Cl. ............... 709/203; 709/201; 709/209; 709/220; 709/227
(58) Field of Classification Search ......... 709/200, 709/201, 220, 221, 227, 209, 203; 714/4
See application file for complete search history.

(56) References Cited

U.S. PATENT DOCUMENTS

| | | | |
|---|---|---|---|
| 5,185,860 A * | 2/1993 | Wu | |
| 5,748,958 A | 5/1998 | Badovinatz et al. ........ 395/670 |
| 5,774,668 A * | 6/1998 | Choquier et al. | |
| 5,867,665 A | 2/1999 | Butman et al. ........ 395/200.68 |
| 5,933,490 A * | 8/1999 | White et al. | |
| 5,946,690 A | 8/1999 | Pitts ........................... 707/10 |
| 5,956,489 A * | 9/1999 | San Andres et al. | |
| 5,991,771 A | 11/1999 | Falls et al. ................. 707/202 |
| 6,151,688 A * | 11/2000 | Wipfel et al. | |
| 6,161,191 A * | 12/2000 | Slaughter et al. | |
| 6,209,018 B1 * | 3/2001 | Ben-Shachar et al. | |
| 6,279,032 B1 * | 8/2001 | Short et al. | |
| 6,427,163 B1 * | 7/2002 | Arendt et al. | |

OTHER PUBLICATIONS

"Multiplatform Clustering (Technology Information)", Young, Charlie, HP Professional , vol. 13, Issue 9, Sep. 1, 1999.

* cited by examiner

*Primary Examiner*—Saleh Najjar
*Assistant Examiner*—Michael Y. Won
(74) *Attorney, Agent, or Firm*—Lawrence D. Cutter, Esq.; Kevin P. Radigan, Esq.; Heslin Rothenberg Farley & Mesiti, P.C.

(57) ABSTRACT

A client application sends a request to a given server of a replicated group of servers, and expects a response to the request. If the client does not receive a response to the request, or if the server is otherwise unavailable, the client is automatically reconnected to another server of the replicated group. The servers of the replicated group do not, however, have to have any knowledge of the communication session of the client.

27 Claims, 10 Drawing Sheets fig. 1 fig. 2 fig. 3 fig. 4A fig. 4B fig. 5 fig. 6 fig. 7 fig. 8 fig. 9 fig. 11

METHOD, SYSTEM AND PROGRAM PRODUCTS FOR AUTOMATICALLY CONNECTING A CLIENT TO A SERVER OF A REPLICATED GROUP OF SERVERS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Method, System And Program Products For Efficiently Locking Resources Of A Global Data Repository," Uceda-Sosa et al., Ser. No. 09/583,797, filed May 31, 2000;

"Method, System And Program Products For Modifying Globally Stored Tables Of A Client-Server Environment," Uceda-Sosa et al., Ser. No. 09/583,585, filed May 31, 2000;

"Method, System And Program Products For Concurrent Write Access To A Global Data Repository," Uceda-Sosa et al., Ser. No. 09/584,523, filed May 31, 2000; and "Method, System And Program Products For Concurrently Accessing A Global Data Repository By Multi-threaded Clients," Uceda-Sosa et al., Ser. No. 09/584,609, filed May 31, 2000.

TECHNICAL FIELD

This invention relates, in general, to a distributed computing environment, and in particular, to managing the connections between a client and a replicated group of servers of the distributed computing environment.

BACKGROUND ART

Distributed systems are highly-available, scalable systems that are utilized in various situations, including those situations that require a high-throughput of work or continuous or nearly continuous availability of the system.

One type of distributed computing environment is a client-server environment, in which a client sends requests to a server of the environment. These requests are processed by the server, and the results of the requests are forwarded from the server back to the client.

In such environments, mechanisms are typically in place to notify the client when the server is unavailable. This allows the client to resend its requests to another server, if desired. In this scenario, the servers are heavyweight in that they need to know which clients they will be receiving messages from and the state of those clients.

Thus, although some efforts have been made to detect failures and to resend messages, further enhancements are needed. In particular, a capability is needed that facilitates earlier detection of a failure and that allows a client to reconnect to another server efficiently. Further, the server is to be lightweight in that it does not need to have knowledge of the client's communication session.

SUMMARY OF THE INVENTION

The shortcomings of the prior art are overcome and additional advantages are provided through the provision of a method of managing connections between clients and servers of a distributed computing environment. The method includes, for instance, determining, by a client of the distributed computing environment, that a server coupled to the client, via a communications protocol that lacks individualized timeouts for individual components of the distributed computing environment, is unavailable to process requests for the client, wherein the server is a member of a group of a plurality of replicated servers; and connecting the client to another replicated server of the group, wherein servers of the group lack knowledge of a communication session of the client.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with at least one aspect of the present invention, an automatic reconnection procedure is provided, which enables a client of a distributed computing environment that has an unacceptable (e.g., failed or too slow) connection with one server of a group of replicated servers to be reconnected with another server of the group. This reconnection is transparent to any client applications executing on the client, and does not require heavy communications protocols for the server. For instance, the servers of the replicated group need not keep explicit information at the application level of the client's communication session.

Figure 1:
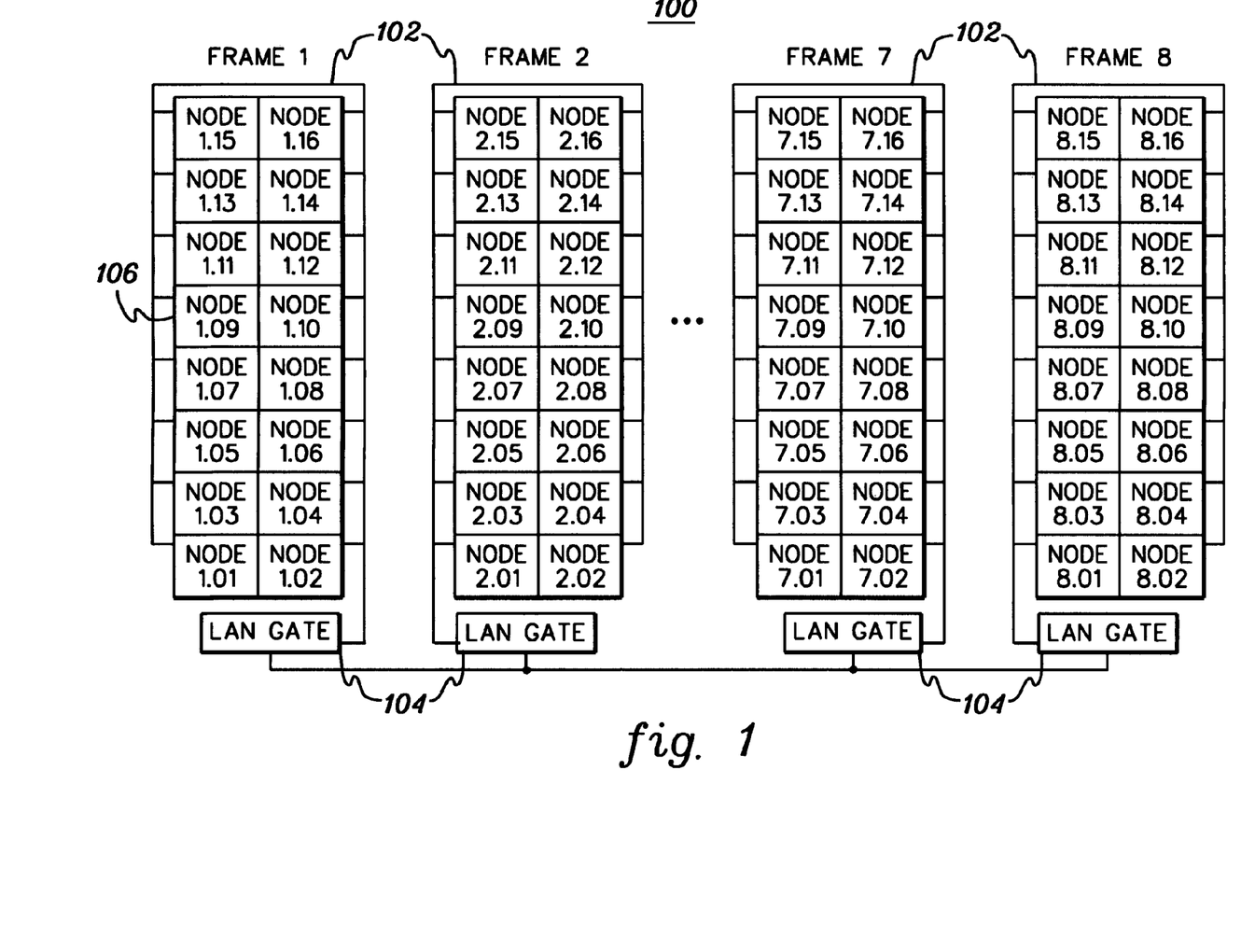
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Figure 2:
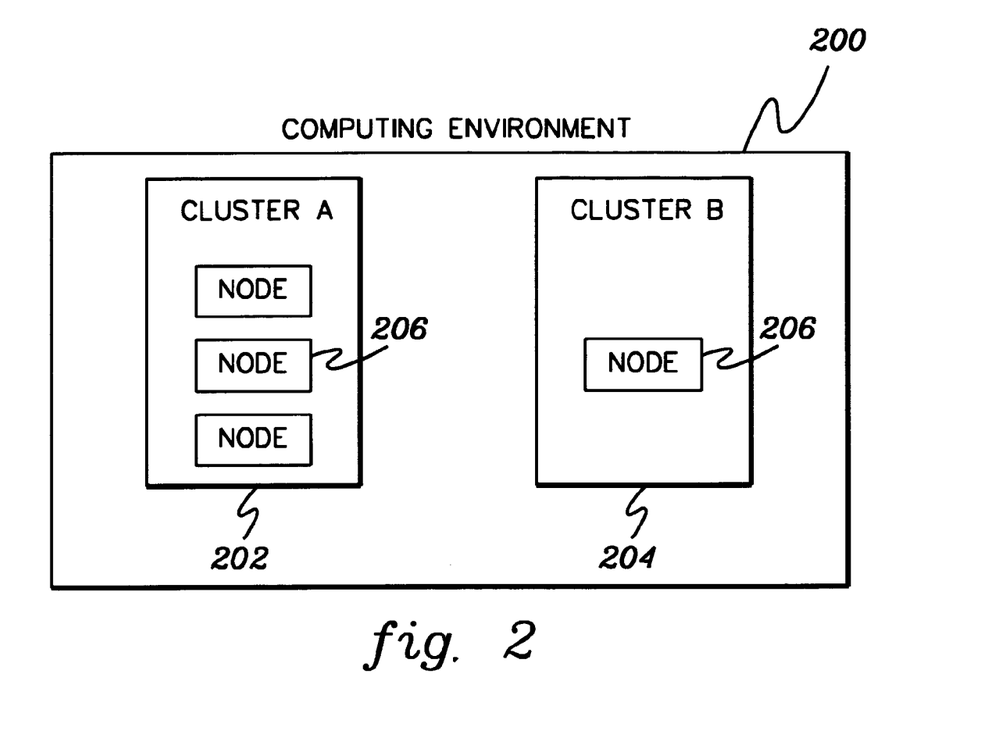
FIG. 2 depicts one embodiment of a computing environment having a plurality of clusters, used in accordance with an aspect of the present invention.

A distributed computing environment, which has the capability of sharing resources is termed a cluster. In particular, a computing environment can include one or more clusters. For example, as shown in FIG. 2, a computing environment 200 includes two clusters: Cluster A 202 and Cluster B 204. Each cluster includes one or more nodes 206, which share resources and collaborate with each other in performing system tasks. Each node includes an individual copy of the operating system.

Each cluster is managed by a cluster architecture, which includes a plurality of components (e.g., a management component, a registry component, a liveness component, a group services component and a resource management component). Each component executes one or more corresponding processes on one or more nodes of a cluster. If the component executes a plurality of processes on a plurality of nodes, then the architecture is distributed across those nodes. One example of a cluster architecture and the management of that architecture is described in detail in U.S. Patent Application entitled "Method, System And Program Products For Managing A Clustered Computing Environment," Novaes et al., Ser. No. 09/583,677, filed May 31, 2000, which is hereby incorporated herein by reference in its entirety.

Figure 3:
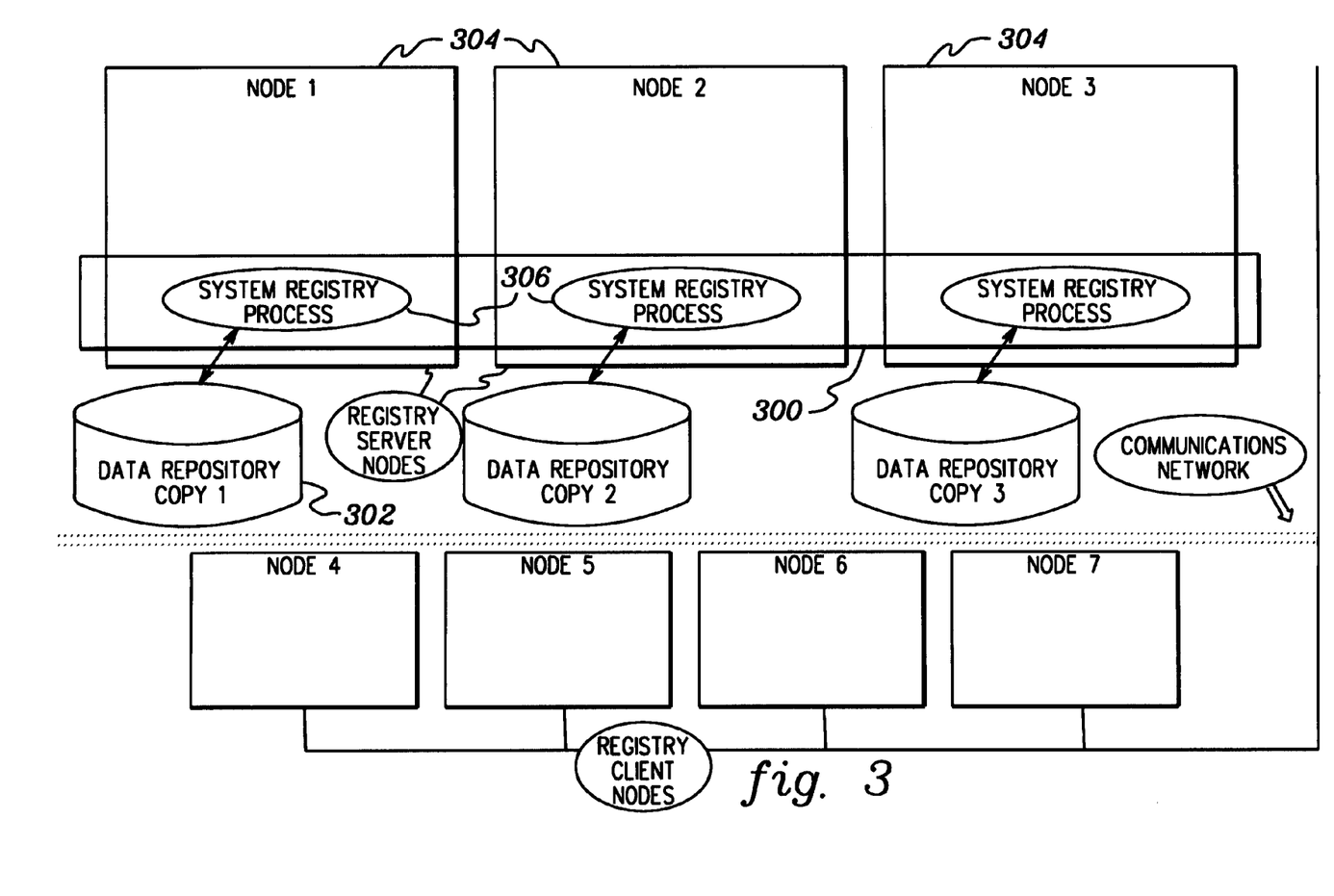
FIG. 3 depicts one embodiment of a computing environment in which a system registry component is located on only a portion of the nodes of the environment, in accordance with an aspect of the present invention.

The nodes of a cluster are capable of sharing resources and data with one another. In one embodiment, in order to facilitate the sharing of data, a system registry component 300 (FIG. 3) is used, which is highly available and provides access to at least one global data repository 302. In one example, system registry 300 is replicated among a plurality of nodes 304, as system registry processes 306. In one embodiment, however, the system registry is replicated on fewer than all of the nodes of a cluster. As shown in FIG. 3, Nodes 1, 2 and 3 include a system registry process 306, while Nodes 4–7 do not. Nodes 4–7 are thus, considered registry client nodes of a client-server environment, while Nodes 1–3 are considered registry server nodes of the environment, since the registry function is executed on those nodes.

The system registry subsystem, along with one or more global data repositories, are regularly accessed by the other components of the cluster architecture. Communication with a data repository is, for instance, connection oriented (using, for instance, stream TCP sockets), since the existence of a session context between a client and a server aids in avoiding unnecessary network traffic.

Figure 4A:
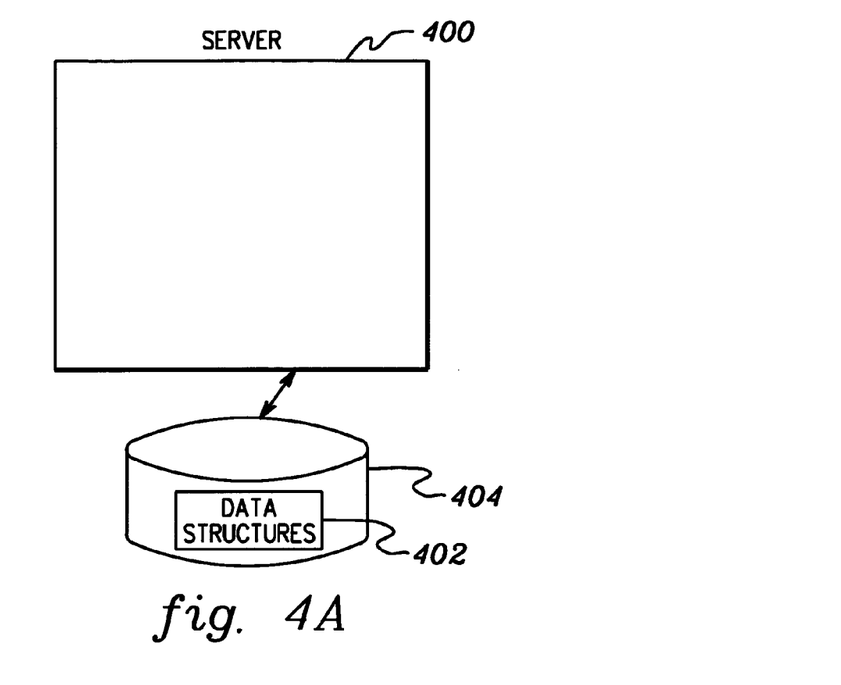
FIG. 4a depicts one example of a global data repository coupled to a server node, in accordance with an aspect of the present invention.
Figure 4B:
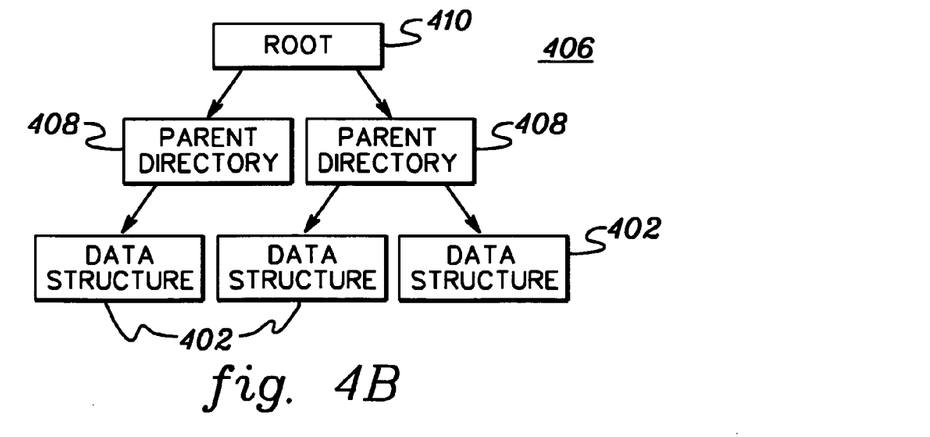
FIG. 4b depicts one example of a global tree structure used in accordance with an aspect of the present invention.

In one embodiment, a registry server node 400 (FIG. 4a) stores persistent information, such as configuration data, in one or more data structures 402 (e.g., tables) of a global data repository 404 coupled to the server. The data structures are maintained in a server data tree 406 (FIG. 4b) under parent directories 408. The topmost directory of the tree is considered the root of the tree 410. (As one example, each server node stores data in a global data repository, and thus, manages such as server tree. In another example, one or more server nodes store data in one or more data repositories, and thus, manage one or more server trees.)

To facilitate access to a global data repository, a client application (a.k.a., a process or a user application) executing on, for instance, a client node of the client-server environment links to a Repository Client Library stored on or coupled to the client node. In one example, the Library is dynamically linked.

Client applications are, for instance, multithreaded processes, possibly made up of several linked libraries (themselves multithreaded), which desire access to the data of one or more data repositories. That is, the threads of an application may belong to different, independent libraries and/or other processes of the application. Each of the library threads opens a private connection to a data repository server. This connection may or may not be shared by other cooperating threads outside of the library space.

In one embodiment, the threads of a client application have access to the same copy of the Client Library, and the Client Library allows access to several contexts of communication with the repository servers. Further, the Client Library runs mostly on the threads of the client application, and thus, requests to the server are blocking. That is, the Library does not return control to the client thread until the server request has been completed. Since the client application is multithreaded, concurrent requests to the same server are allowed.

Each client application (i.e., each thread) can issue single requests against data structures (e.g., tables) of a repository, which are synchronized at a server which manages the particular repository. That is, the server serializes write access to a single table, even though several different data structures of a repository can be accessed concurrently. Alternatively, the client application can lock one or more data structures in order to guarantee exclusive or shared access to the locked structures. Locks are mandatory in that the server checks for the presence of locks before granting access to a data structure.

Figure 5:
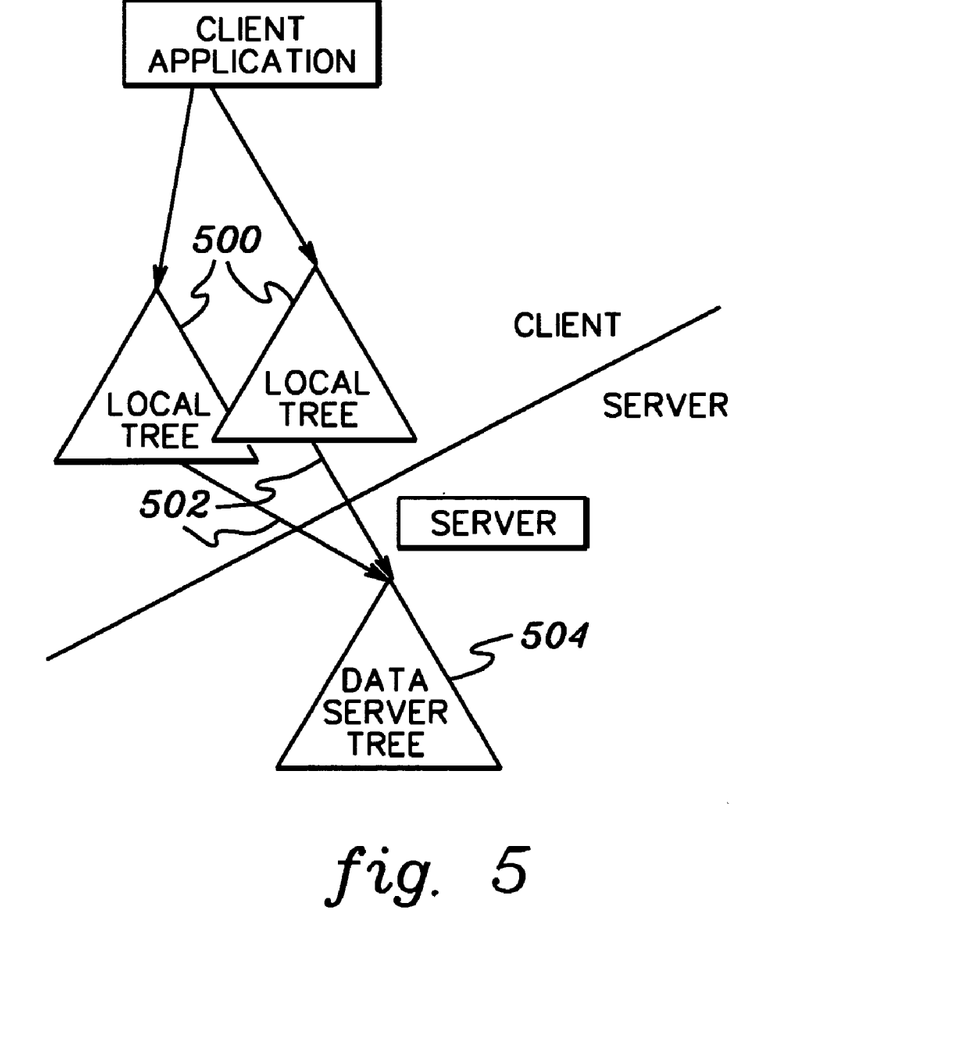
FIG. 5 depicts one example of one or more local trees being mounted to the global tree of FIG. 4b, in accordance with an aspect of the present invention.

To further facilitate access to a data repository, a client application (e.g., one or more threads of the application) opens one or more local trees 500 (FIG. 5). A local tree is a data tree that can be opened in the space of the client application by any of its threads. In particular, a thread of the client application forwards an application programming interface (API) function requesting an Open to the Client Library, which creates an empty local tree in the process and provides a root directory.

A local tree can be viewed as a virtual connection that represents the data associated to the physical connection using the high-level data representation of the data repository itself. When a client application (in particular, a thread) opens a local tree, an empty tree is created and a handle (a unique identifier) is returned to the user. This data tree can than be accessed by any of the threads of the application, which have a copy of its handle. A local tree can also be closed by any of its threads. All of the resources (e.g., tables and/or directories) associated with the local tree are disposed of by the Data Repository Client Library.

At this point, any operation performed on the tree is local. There is no access to the server data. In order to have access to the server data, one or more mounts points 502 can be requested by the client. In particular, one or more directories of the local trees are designated as mount points. There can be an arbitrary number of mount points to the same or different servers. A mount operation implicitly opens a network connection (in one implementation, a TCP stream socket) to the server. Any directory that acts as a mount point is identified with (or acts as a proxy for) the root of the global data server tree 504 to be accessed. This way, the user can access local trees, as if they were remote. In particular, the server data tree is accessed transparently by the user, as if it was part of the local tree.

At any given time, there is, for instance, at most one network connection to a data repository server. That is, all of the mount points that map to the same server tree share the same connection. The Data Repository Client Library keeps a bounded number (e.g., two threads) of threads to handle the incoming and outcoming network traffic, respectively. By using a bounded number of threads, the Client Library does not overthread the client application, thus avoiding a performance bottleneck. Instead, the connection to a server is decoupled from the virtual context that a Library uses in order to work with a server.

It is possible to augment the number of communication threads in order to multiplex over several connections. However, in this embodiment, this number is static, and does not depend on the number of connections currently active. A connection to a server is active, while there is at least one mount point to that server from any of the local trees of the client application. A mount point is closed through an unmount operation on the mount point directory.

Each local tree can be globally accessed by any thread in the client application. Each tree keeps the state of the communication between the client and the server, which includes information about the data repository resources (e.g., tables and directories) accessed and the resources reserved by the local tree. That is, a set of tables is reserved by explicitly locking the tables in the server on behalf of a local tree through a lockTables operation. One example of a lockTables operation is described in detail in U.S. Pat. No. 6,668,225 entitled "Method, System And Program Products For Concurrent Write Access To A Global Data Repository," issued on Jan. 20, 2004, which is hereby incorporated herein by reference in its entirety.

The set of tables locked, as a result of such an operation, is called a lock set. The return value of a lockTables invocation is a lockId, which can be employed by any of the threads in the client application to use the locked tables of a local tree and/or to unlock the tables of the tree in the server (through, for instance, an unlockTables invocation). Each lock set is associated with the mount point through which it was acquired.

Figure 6:
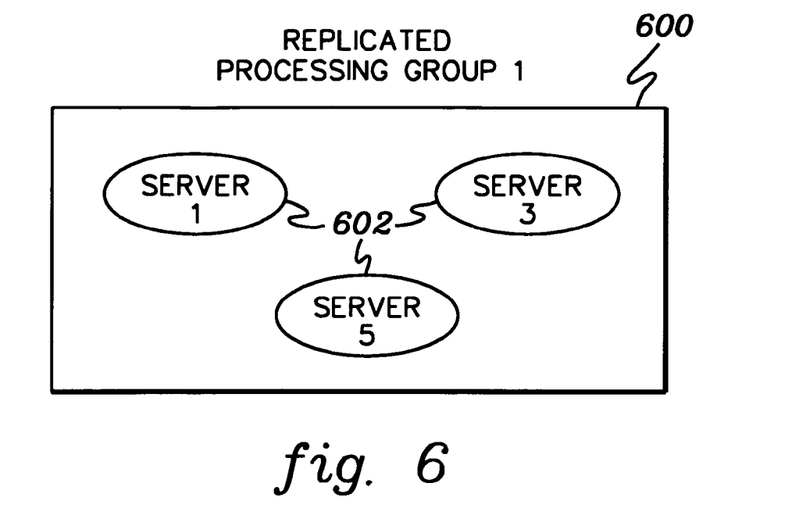
FIG. 6 depicts one example of a replicated processing group having a plurality of members, in accordance with an aspect of the present invention.

One or more servers of the client-server environment can be included in a replicated processing group 600 (FIG. 6). Each of the servers 602 in the group is called a replica. The replicas in the group share data and state in order to keep the servers available to the client. Thus, client applications of the client are able to transparently reconnect to any of the replicas and obtain the same service, in the case that the current replica is not available. The servers of a group can be located in one or more nodes of the client-server environment, and the servers of a group serve the same data to a set of clients. Each of the replicas usually concurrently serves several clients, which may be local or remote.

There may be one or more replicated processing groups within a computing environment. In one embodiment, a particular server is a member of only one group, at a time. However, a client can have connections and send requests to one or more different groups.

Figure 7:
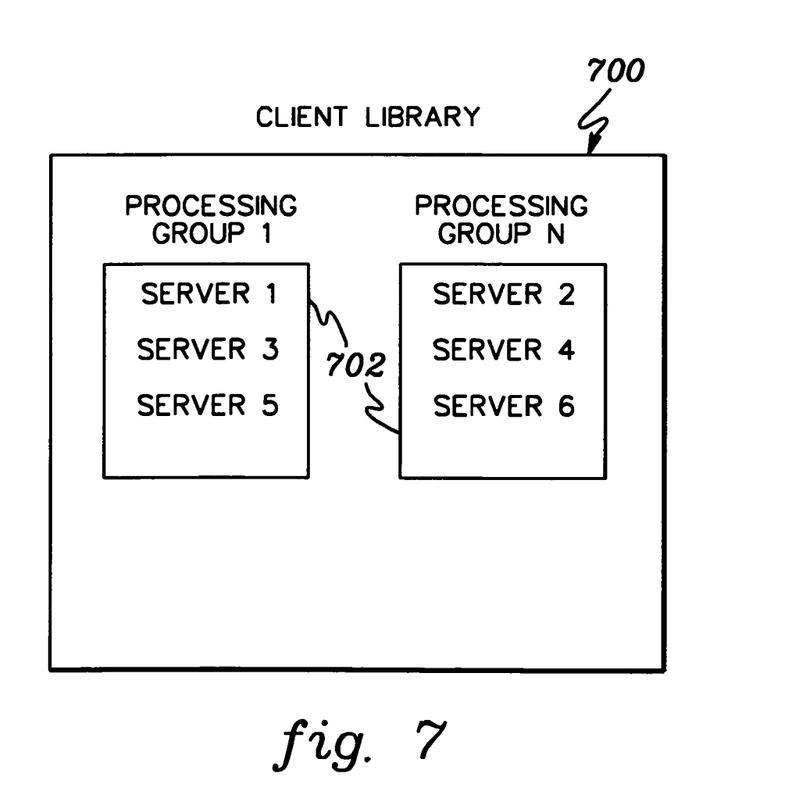
FIG. 7 depicts one embodiment of processing group lists within a Client Library, in accordance with an aspect of the present invention.

The forwarding of requests to a particular replicated server group is handling by the Repository Client Library coupled to the clients. The Client Library keeps a list of the set of replicas for each group. For example, as shown in FIG. 7, a Client Library 700 keeps a list 702 of the replicated servers for each of the replicated processing groups of the computing environment. There may be one or more replicated processing groups, and each of the processing groups may have one or more servers. This list can be obtained from the client application, from one of the replicas, or from designated system files.

Further details regarding the management of processing group are described in U.S. Pat. No. 5,748,958 entitled "System For Utilizing Batch Request To Present Membership Changes To Process Groups," issued on May 5, 1998; and U.S. Pat. No. 6,823,355 entitled "Synchronous Replication Of Transactions In A Distributed System," issued on Nov. 23, 2004, each of which is hereby incorporated herein by reference in its entirety.

As mentioned above, the Client Library routes requests from a client application to a server of one of the replicated groups. Each of these requests is issued from a client application thread that blocks until a response to the request has been received from the server. To facilitate the routing between a client and server, the Client Library uses a request broker coupled to or located within the Client Library. In one example, a request broker 800 (FIG. 8) includes an input queue 802 to hold requests received from the client; an output queue 804 to hold responses to requests received from the server; a send thread 806 used to send requests to the server; a receive thread 808 used to receive responses from the server; a control thread 810, along with a set of procedures, to control communication between the client and server; and a set of currently active connections.

Figure 8:
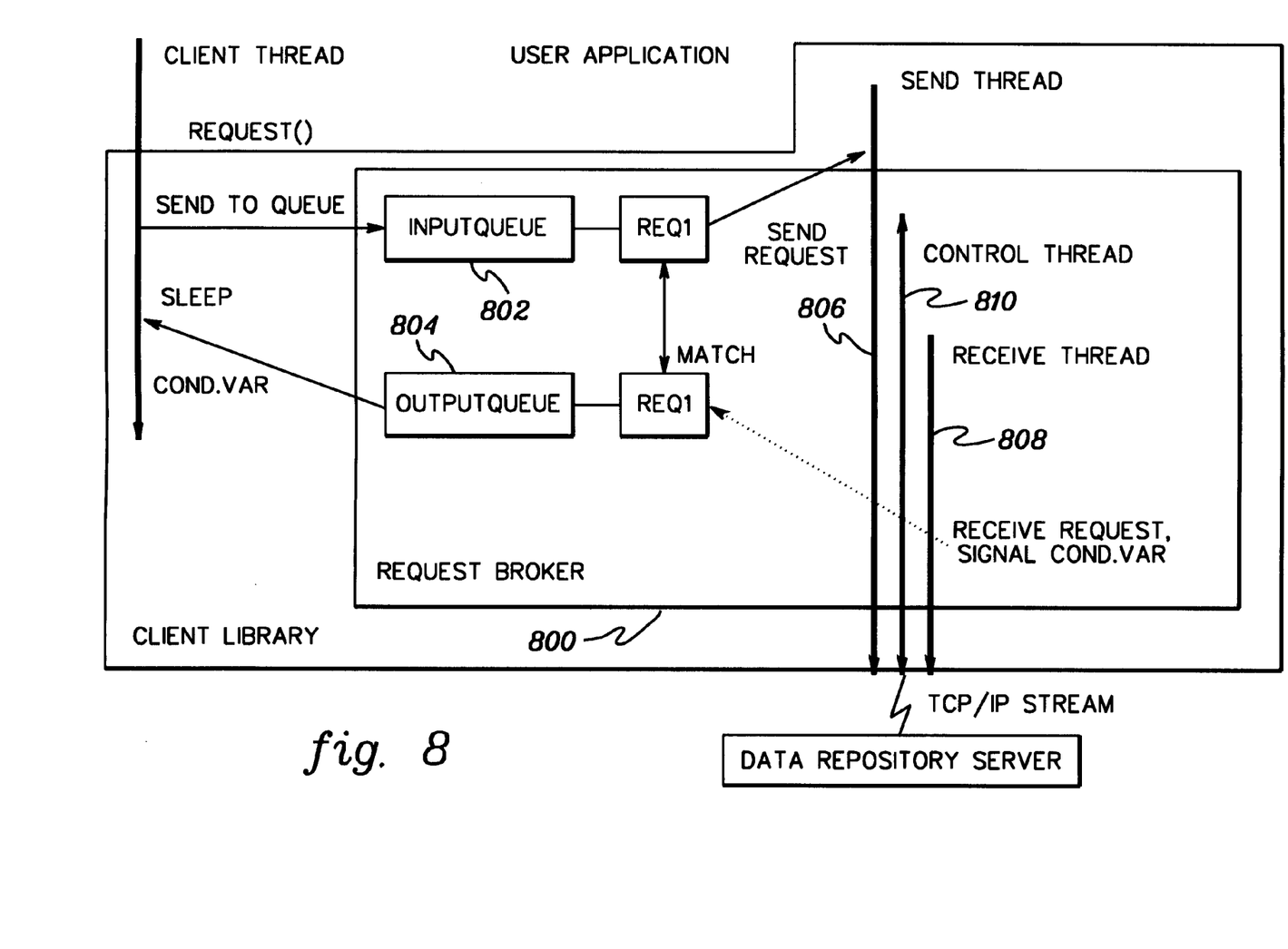
FIG. 8 graphically illustrates one example of a client thread sending a blocking request to a server, in accordance with an aspect of the present invention.

One embodiment of the logic associated with employing a Client Library to communicate between a client application and a server is described with reference to FIG. 9. (Reference to FIG. 8 is also beneficial.)

Figure 9:
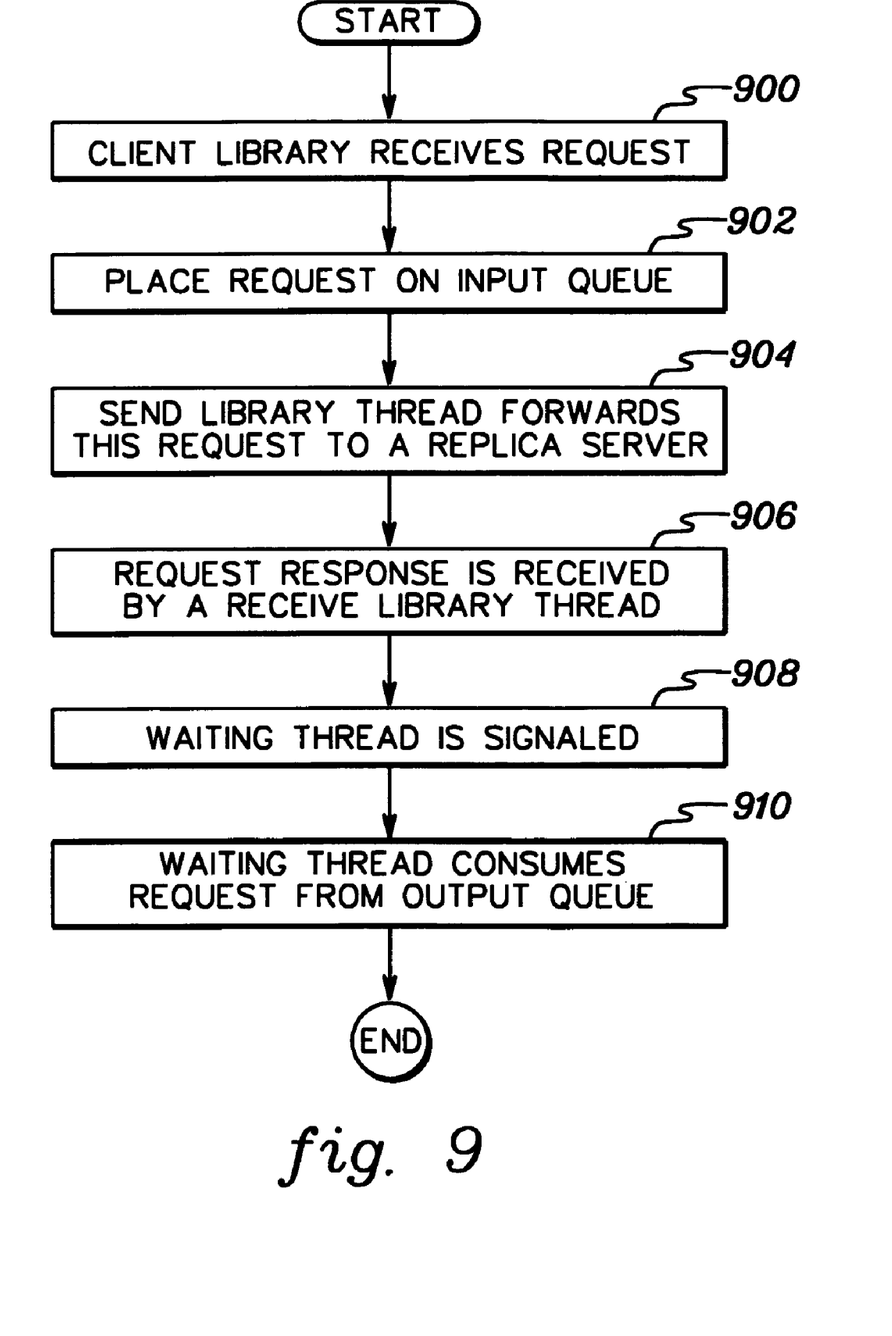
FIG. 9 depicts one embodiment of the logic associated with communications between a client and a server, in accordance with an aspect of the present invention.

In one example, the Client Library, which is running on the application thread, receives a request from the application, STEP 900 (FIG. 9). The Client Library then places this request on input queue 802 (FIG. 8), STEP 902. The application thread then sleeps (waits) until a condition variable is signaled by receive thread 808, as described below.

Thereafter, send thread 806 forwards the request to a replica server, STEP 904. The replica server responds to the request. When this request response is received, STEP 906, another thread in the Client Library signals on the condition variable to the waiting thread, STEP 908. The waiting thread then consumes the request from output queue 804, STEP 910.

Problems arise, however, when the client receives no answer for pending requests in the server. Interruption of the communication between a client process and the server process can occur for several reasons. For example, the server process can terminate, the server host (node) can crash, and/or the server host can be unreachable due to network problems. While termination of the server process is easy to detect, since TCP immediately delivers a FIN message to the other end, the last two cases are harder to detect, especially if there is no socket activity.

In particular, since the sockets are created with a SO_KEEPALIVE option, TCP will eventually deliver a timeout (e.g., ETIMEDOUT) error on the connection (by issuing a keepalive message to the other end and detecting the failure). However, this occurs only after a long period of time, the default being 2 hours. Further, this timeout is kernel wide (i.e., for the entire node). That is, TCP does not individualize timeouts for individual components (e.g., servers, clients, processes) on the node. There is only a node-wide timeout. Thus, it is unacceptable to let TCP handle the case where the client has outstanding requests or lock sets in the server. The alternative solution (the connection is just idle, and there are no pending requests) is handled by TCP, since an inactive socket is a small overhead in both the client and the server.

In order to more quickly detect server failure, and thus, be able to more efficiently take appropriate action, a request broker is used, in accordance with an aspect of the present invention, to assess the health of connections to the server replicas.

In one example, both the client and the server have respective request brokers. In particular, a client request broker 1000 (FIG. 10) is called by methods (object-oriented) of one or more local trees 1002 to forward requests of the local trees to a server. The client request broker is coupled to the server via a server request broker 1004. The server request broker in turn communicates with a server tree 1006 of the server. In one example, each of the client and server request brokers has a fixed number of threads to handle input/output requests.

Figure 10:
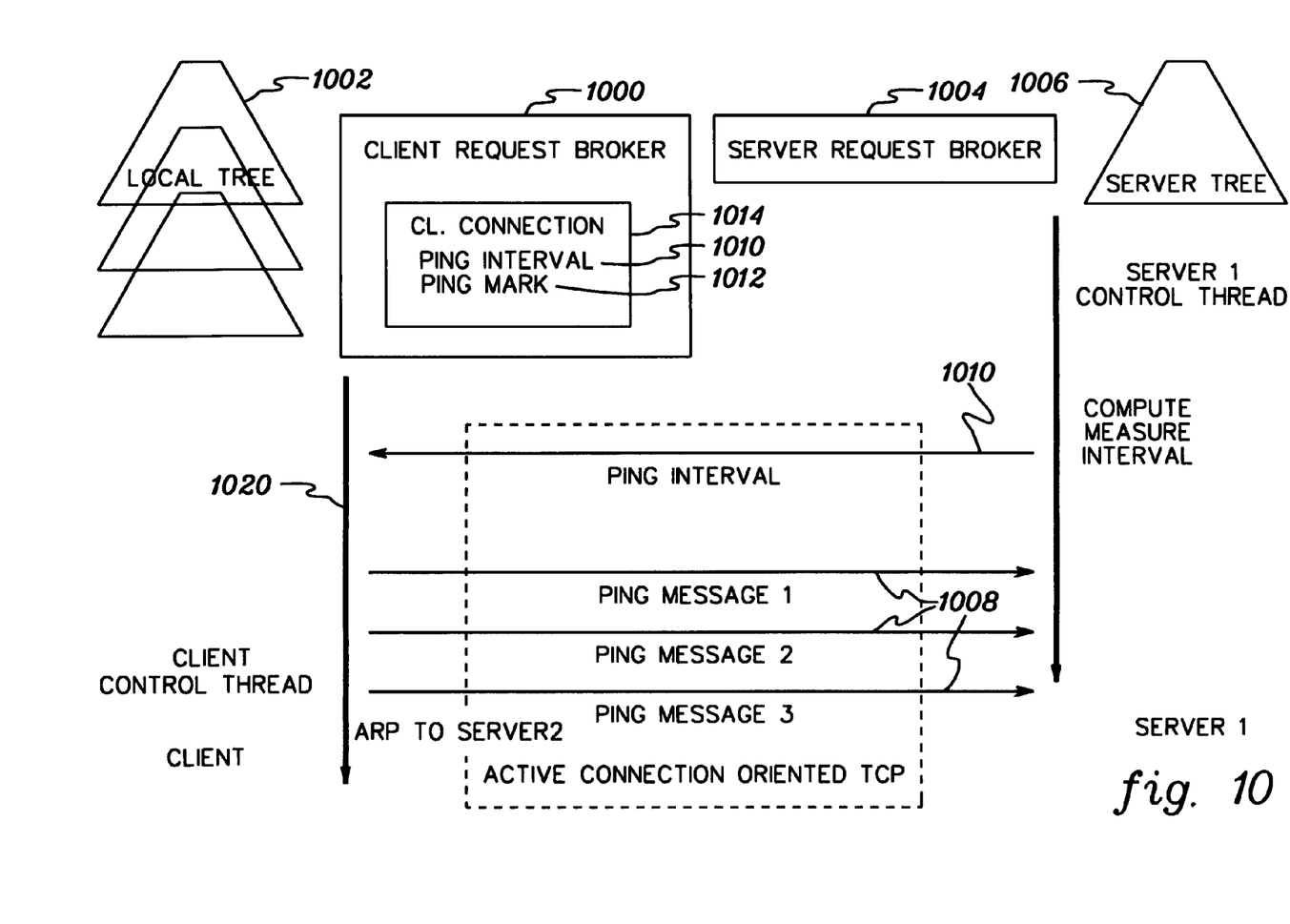
FIG. 10 graphically illustrates one example of a ping interval and ping messages being communicated between a client and a server, in accordance with an aspect of the present invention.

In this embodiment, it is the client request broker that assesses the health of the connections to the servers by using ping messages 1008. A ping message is a liveness or heartbeat message used to detect whether a connection is alive and well. Each connection has a ping interval 1010 provided by the server indicating how often information should be received from the server, and a ping mark 1012 indicating whether the server should be checked (i.e., whether a ping message should be sent). The ping mark is set to true, when there are either lock sets or pending requests. In one example, the ping interval and ping mark are stored in a client connection data structure 1014 of the client request broker. There is a client connection data structure for each connection of the client request broker to a server request broker (there may be one or more server request brokers per client request broker).

In one embodiment, the ping interval is dynamic, in order not to flood the network with ping messages. The ping interval is directly proportional to the workload of the server, thus avoiding interrupting the server when its workload is heavy.

As one example, the ping interval is determined by the server and is computed using a network latency and a MeasureInterval, which indicates the workload level of the server (i.e., how busy). For example, the ping interval=(2× network latency)+MeasureInterval. One embodiment for determining a MeasureInterval is described in detail in U.S. Patent Application entitled "Method, System And Program Products For Dynamically Reassigning Threads Of Servers Having Request Queues," Rosario A. Uceda-Sosa, (Docket POU9-2000-0022-US1), Ser. No. 09/584,480, filed May 31, 2000, which is hereby incorporated herein by reference in its entirety.

When a connection is opened, the server sends the ping interval to the client. The ping interval may change dynamically over time, just as the MeasureInterval in the server does. The server retransmits the ping interval when it has changed. Although this does not happen often, in one example, it happens when the MeasureInterval has varied over a given threshold.

In addition to the above, each connection has a timestamp indicating the last time data was received from the other end. This data could be the result of a request or a ping.

If a given number of pings fail (this number is determined, for instance, by the administrator or by using a predefined default value), an automatic reconnection procedure, in accordance with an aspect of the present invention, takes place. One embodiment of the logic associated with an automatic reconnection procedure is described in detail with further reference to FIG. 10 and with reference to FIG. 11. In particular, FIG. 10 is a graphical illustration of detecting a failure and then reconnecting to another server, while FIG. 11 depicts one embodiment of the logic associated with detecting a failure and then reconnecting to another server.

Figure 11:
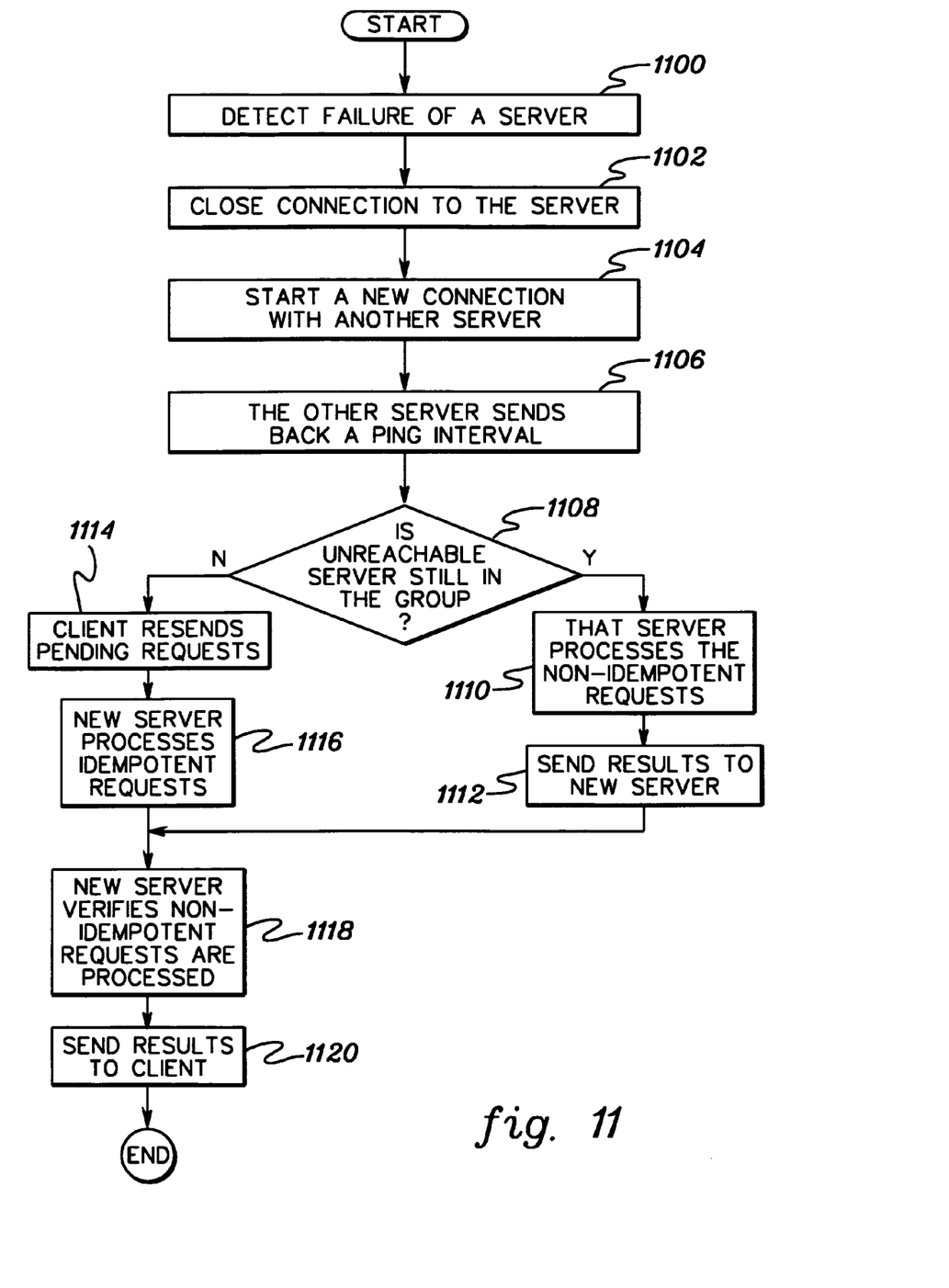
FIG. 11 depicts one embodiment of the logic associated with a client detecting a failure and reconnecting to another server of a group of replicated servers, in accordance with an aspect of the present invention.

Referring to FIG. 11, initially the failure of a server is detected, STEP 1100. In particular, in one example, the client request broker has a control thread 1020 (FIG. 10) that checks, for each server coupled thereto, the connection timestamps, their ping intervals and their ping marks to ascertain whether a ping message should be sent to the server. If a message is to be sent, then a ping message 1008 is sent through the connection.

If a given number of pings fail, then it is assumed that the server is unavailable for any one of a number of reasons. In particular, the server is assumed unavailable when a client has pending requests in the server and the regular monitoring of the health of the connection indicates that there is a failure; or when the client is trying to send a request and the server host is unreachable, regardless of whether there are any pending lock sets or requests.

Subsequent to detecting that the server is unreachable, the connection to the server is closed, STEP 1102. Thereafter, the client attempts to start a connection with another server selected from the replicated group. Each server of the group keeps a log of the write client requests that have been processed so far. In one example, a server is selected based on its placement in the processing group list, or in a further example, it is selected based on workload. Servers in the server list are tried until one of them can be reached. If none of the servers can be reached, then the pending requests are eliminated from the queues, and the user is returned a No_Server return code. For this example, it is assumed that Server 1 is unavailable, but Server 3, which is in the same replicated processing group as Server 1 (see FIG. 7), is available, STEP 1104. The initial message sent to Server 3 indicates that this a reconnection from Server 1.

Subsequently, Server 3 sends back to the client its own ping interval, which gets recorded in the connection data structure 1014, STEP 1106.

Next, Server 3 verifies whether Server 1 is no longer in the server group, INQUIRY 1108. In particular, if Server 1 has failed, then it would have been expelled from the group. If, however, it is still in the group, then that indicates that Server 1 is just not reachable by the client, but may be reachable by a peer (e.g., Server 3).

If Server 1 is still active and reachable from Server 3, and thus, still in the server group, Server 1 processes all non-idempotent pending requests from the client, which are re-routed to Server 1 via Server 3, STEP 1110. A non-idempotent request is one that cannot be reissued without affecting its result. For example, in a data repository, create directory or create table operations are not idempotent. By having Server 1 process these requests, the requests may take longer to process, but they will not affect the consistency of the state of the server group. The results of processing these requests is then sent from Server 1 to Server 3, STEP 1112.

However, if Server 1 is not in the processing group, INQUIRY 1108, then the client proceeds to resend all the pending requests (which are placed in a pending queue), indicating that they are reissued, STEP 1114. Server 3 processes the idempotent requests, STEP 1116, and verifies that the non-idempotent requests are processed too, either by Server 1, as indicated above, or by Server 3, itself, STEP 1118. In particular, Server 3 looks into its log to determine if the non-idempotent requests match any of the requests that have been processed. If any non-idempotent requests have not been processed (maybe Server 1 went down before the replication process took place), then they are initiated by Server 3. If they have been processed, then their results, along with the results of the idempotent requests are sent back to the client, STEP 1120.

In the scenario described above, since pending requests from the client are concurrent (e.g., they are issued by different threads), they can be processed in any order that Server 3 deems appropriate. Further, new requests are processed by Server 3, as the new replica.

Described above is a facility in which the reconnection to a new server is performed transparently to the user, so that client applications do not have to take into account the resending of their requests to several servers. Each of the replicas of the group share data and state in order to keep the service available. The client application can transparently reconnect to any of the replicas and obtain the same service, in the event the current replica is unavailable. The facility of the present invention enables a Client Library to efficiently detect server failure and to attempt reconnection to another server in the same group of replicated servers, without the direct intervention of the user application.

Further, the ping interval is proportional to the load of a replica, so that it is dynamically adjusted through the life of the connection. This advantageously prevents the flooding of the network with extra messages for the monitoring. Instead, the monitoring is performed at the appropriate times.

Although this invention is described with reference to a Data Repository Client Library, the invention is not limited to such a Library. The invention can be used with any other type of library, process or module.

Further, while a clustered environment is provided as one example, the invention is not limited to such an environment. For example, it is equally applicable to any computing environment that has a set of replicas designed as an available service, which is to be accessed without interruptions. Additionally, one or more aspects of the present invention are applicable to homogeneous systems, as well as heterogeneous systems. As one example, capabilities are provided to facilitate the interoperability of the systems of a heterogeneous environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing connections between clients and servers of a distributed computing environment, said method comprising:

determining, by a client of said distributed computing environment, that a server coupled to said client, via a communications protocol that lacks individualized timeouts for individual components of said distributed computing environment, is unavailable to process requests for said client, wherein said server is a member of a group of a plurality of replicated servers; and directly connecting, by said client, said client to another replicated server of said group, wherein servers of said group lack knowledge of application-level information of a communication session of said client.

2. The method of claim 1, wherein the determining is performed by a client request broker.

3. The method of claim 1, wherein the determining comprises causing at least one ping message to be sent to the server.

4. The method of claim 3, wherein the causing comprises causing a plurality of ping messages to be sent to the server.

5. The method of claim 4, wherein the causing comprises causing the plurality of ping messages to be sent to the server in accordance with a dynamic ping interval.

6. The method of claim 5, wherein the dynamic ping interval is based on a workload level of the server.

7. The method of claim 4, wherein the determining comprises determining that a predetermined number of the plurality of ping messages have failed.

8. The method of claim 1, wherein the connecting comprises first determining that the another replicated server is available.

9. The method of claim 8, further comprising:
routing non-idempotent client requests from the another replicated server to the server if the server is still part of the group; and
sending results of processing the non-idempotent client requests to the another replicated server.

10. A system of managing connections between clients and servers of a distributed computing environment, said system comprising:
means for determining, by a client of said distributed computing environment, that a server coupled to said client, via a communications protocol that lacks individualized timeouts for individual components of said distributed computing environment, is unavailable to process requests for said client, wherein said server is a member of a group of a plurality of replicated servers; and
means for directly connecting, by said client, said client to another replicated server of said group, wherein servers of said group lack knowledge of application-level information of a communication session of said client.

11. The system of claim 10, wherein the means for determining comprises means for determining by a client request broker.

12. The system of claim 10, wherein the means for determining comprises means for causing at least one ping message to be sent to the server.

13. The system of claim 12, wherein the means for causing comprises means for causing a plurality of ping messages to be sent to the server.

14. The system of claim 13, wherein the means for causing comprises means for causing the plurality of ping messages to be sent to the server in accordance with a dynamic ping interval.

15. The system of claim 14, wherein the dynamic ping interval is based on a workload level of the server.

16. The system of claim 13, wherein the means for determining comprises means for determining that a predetermined number of the plurality of ping messages have failed.

17. The system of claim 10, wherein the means for connecting comprises means for first determining that the another replicated server is available.

18. The system of claim 17, further comprising:
means for routing non-idempotent client requests from the another replicated server to the server if the server is still part of the group; and
means for sending results of processing the non-idempotent client requests to the another replicated server.

19. At least one program storage device readable by a machine, tangibly embodying at least one program of instructions executable by the machine to perform a method of managing connections between clients and servers of a distributed computing environment, said method comprising:
determining, by a client of said distributed computing environment, that a server coupled to said client, via a communications protocol that lacks individualized timeouts for individual components of said distributed computing environment, is unavailable to process requests for said client, wherein said server is a member of a group of a plurality of replicated servers; and
directly connecting, by said client, said client to another replicated server of said group, wherein servers of said group lack knowledge of application-level information of a communication session of said client.

20. The at least one program storage device of claim 19, wherein the determining is performed by a client request broker.

21. The at least one program storage device of claim 19, wherein the determining comprises causing at least one ping message to be sent to the server.

22. The at least one program storage device of claim 21, wherein the causing comprises causing a plurality of ping messages to be sent to the server.

23. The at least one program storage device of claim 22, wherein the causing comprises causing the plurality of ping messages to be sent to the server in accordance with a dynamic ping interval.

24. The at least one program storage device of claim 23, wherein the dynamic ping interval is based on a workload level of the server.

25. The at least one program storage device of claim 22, wherein the determining comprises determining that a predetermined number of the plurality of ping messages have failed.

26. The at least one program storage device of claim 19, wherein the connecting comprises first determining that the another replicated server is available.

27. The at least one program storage device of claim 26, further comprising:
routing non-idempotent client requests from the another replicated server to the server if the server is still part of the group; and
sending results of processing the non-idempotent client requests to the another replicated server.

* * * * *